(12) United States Patent
Kurasawa

(10) Patent No.: US 7,440,043 B2
(45) Date of Patent: Oct. 21, 2008

(54) LIQUID CRYSTAL DISPLAY DEVICE AND ELECTRONIC DEVICE

(75) Inventor: Hayato Kurasawa, Nagano (JP)

(73) Assignee: Seiko Epson Corporation (JP)

( * ) Notice: Subject to any disclaimer, the term of this patent is extended or adjusted under 35 U.S.C. 154(b) by 554 days.

(21) Appl. No.: 11/113,416

(22) Filed: Apr. 22, 2005

(65) Prior Publication Data

US 2005/0248693 A1    Nov. 10, 2005

(30) Foreign Application Priority Data

May 6, 2004   (JP)   ............... 2004-137211

(51) Int. Cl.
*G02F 1/1333* (2006.01)
(52) U.S. Cl. ........................ 349/54; 349/178
(58) Field of Classification Search ............... 349/54, 349/192, 106, 130, 139, 178, 38, 39, 129
See application file for complete search history.

(56) References Cited

U.S. PATENT DOCUMENTS 5,831,708 A * 11/1998 Hiraishi et al. .............. 349/143
6,812,908 B2 * 11/2004 Lim ............................. 345/87
6,970,223 B2 * 11/2005 Lee et al. .................... 349/141

FOREIGN PATENT DOCUMENTS

| JP | 64-31127 | 2/1989 |
| JP | 4-307520 | 10/1992 |

OTHER PUBLICATIONS

M. Jisaki et al., "Development of transflective LCD for high contrast and wide viewing angle by using homeotropic alignment", Asia Display/IDW'01, pp. 133-136 (2001).

* cited by examiner

*Primary Examiner*—Thoi V Duong
(74) *Attorney, Agent, or Firm*—Harness, Dickey & Pierce, P.L.C.

(57) ABSTRACT

A liquid crystal display device includes a liquid crystal layer, a pixel electrode, a switching element, a signal line, and a same potential line. The liquid crystal layer is composed of liquid crystal that has a negative dielectric anisotropy and so is vertically aligned in an initial alignment state. The pixel electrode has a first side and a second side. The first side being opposite from the second side. The switching element is used for applying driving voltage selectively to the pixel electrode. The signal line is connected to the switching element and is located adjacent to the first side of the pixel electrode. The same potential line extends in the same direction as the signal line and is applied with the same voltage as that applied to the signal line. The same potential line is located adjacent to the second side of the pixel electrode.

5 Claims, 5 Drawing Sheets

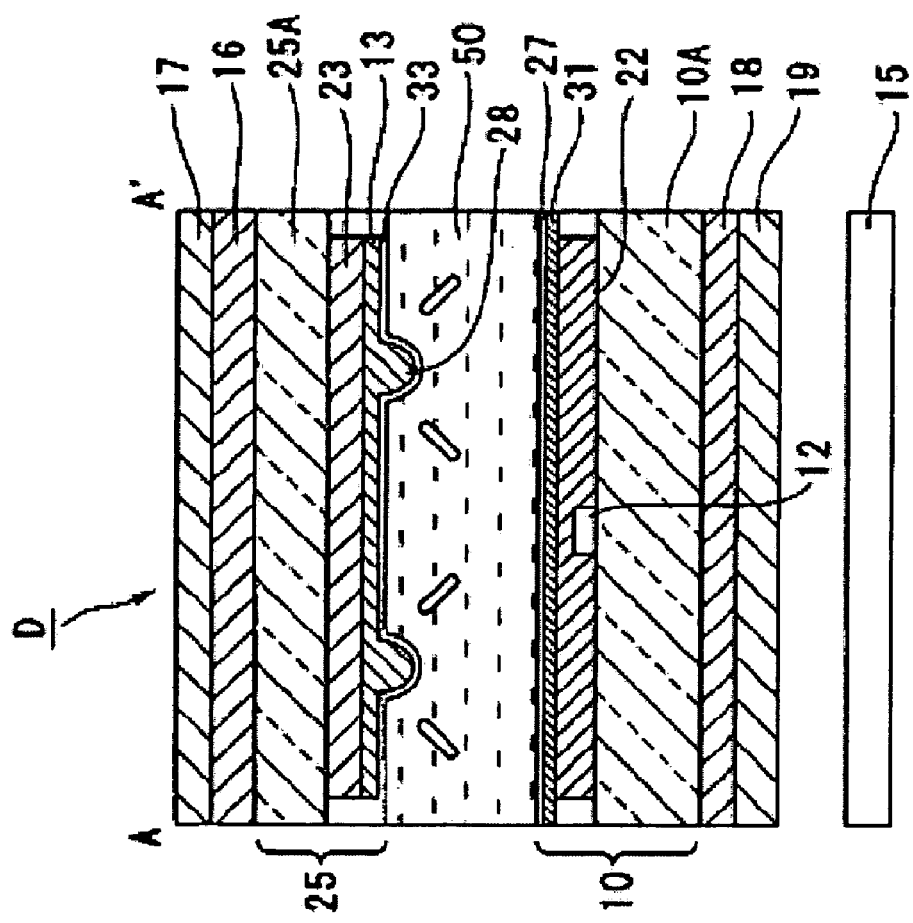
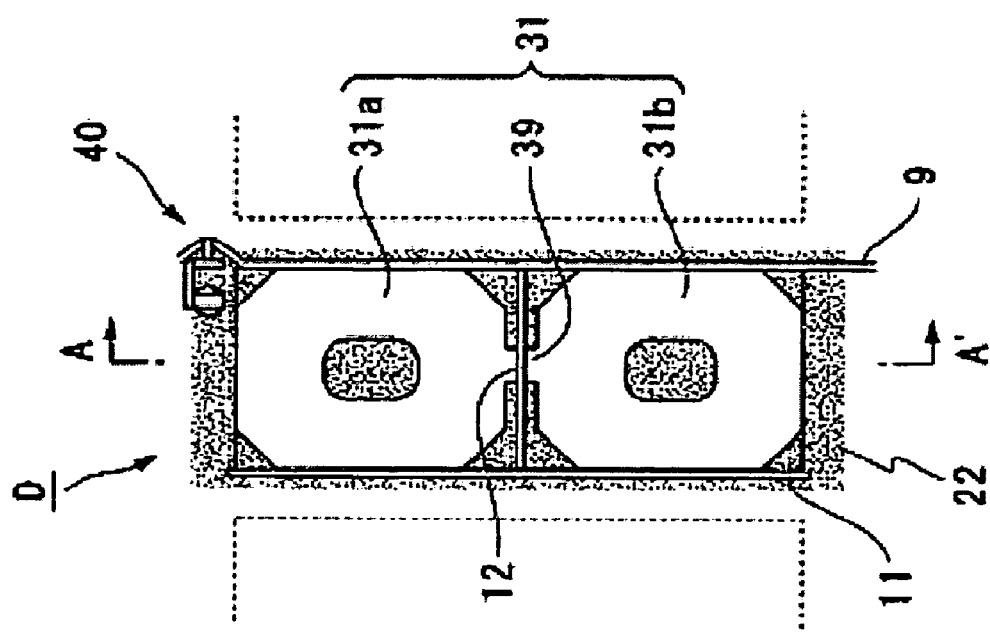

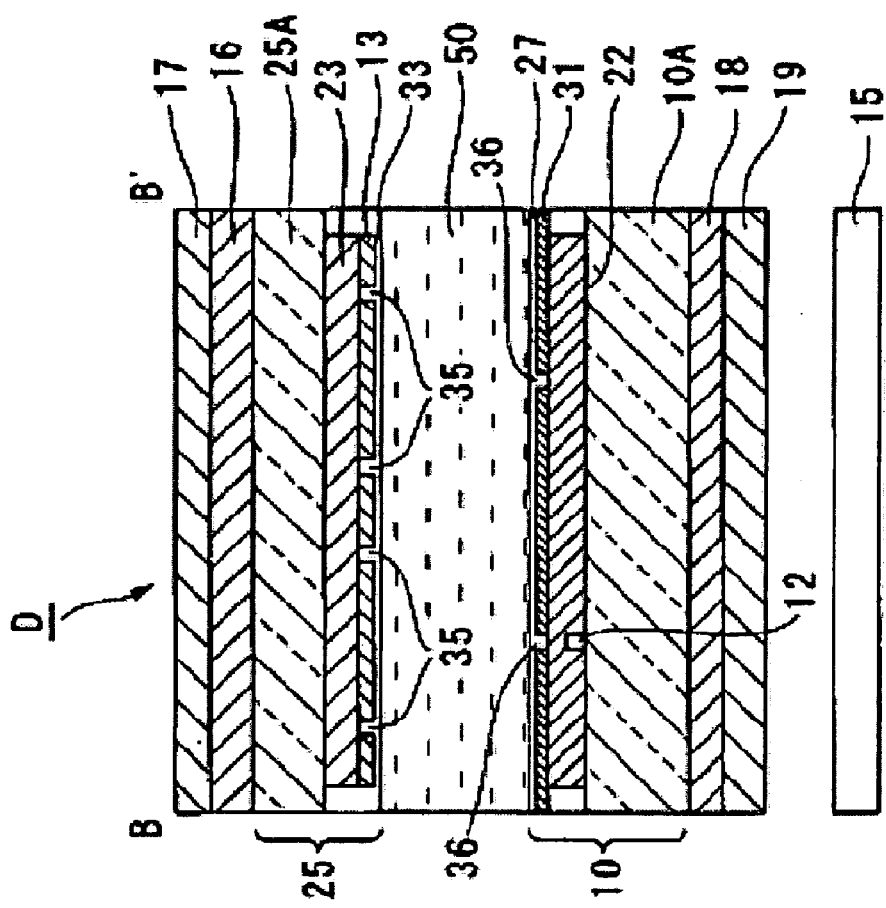
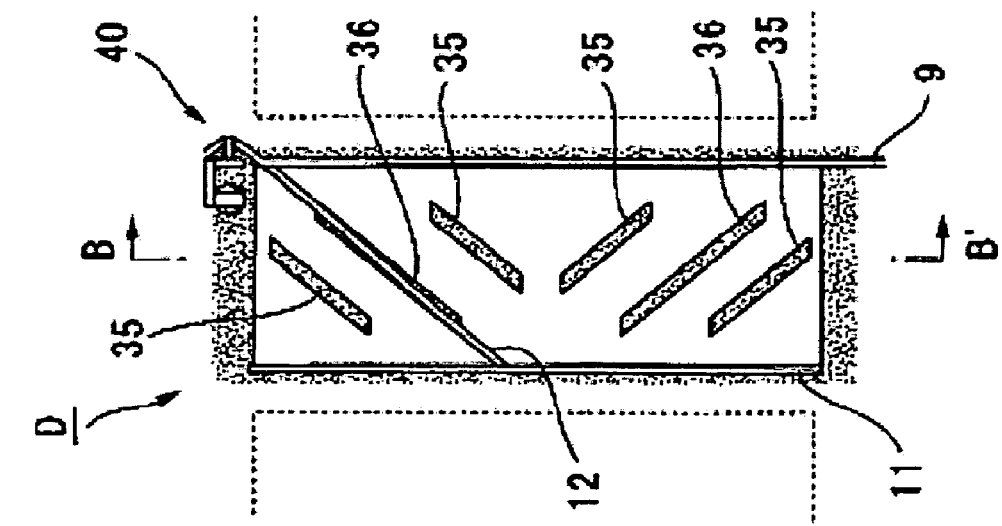

LIQUID CRYSTAL DISPLAY DEVICE AND ELECTRONIC DEVICE

TECHNICAL FIELD

The present invention relates to a liquid crystal display device and an electronic device.

RELATED ART

As a display device for use in a mobile phone, "Development of transflective LCD for high contrast and wide viewing angle by using homeotropic alignment", M. Jisaki et al., Asia Display/IDW'01, p. 133-136 (2001) discloses a liquid crystal display device configured that includes a liquid crystal layer sealed between an upper substrate and a lower substrate. In particular, a liquid crystal display device using a vertically aligned liquid crystal as a liquid crystal layer has been well known as having a wide viewing angle range. In such a vertical alignment type liquid crystal display device, there has been proposed a configuration in which a protrusion is provided on a liquid crystal layer side of a display area in order to tilt initially vertically aligned liquid crystal molecules to a predetermined direction in the presence of an applied voltage.

In addition, such a liquid crystal display device typically employs an active matrix scheme. Examples of the active matrix scheme include a two-terminal active matrix scheme using, as a switching element, a thin film diode (hereinafter referred to as TFD which is also called MIM (metal insulator metal)), a diode-ring element, or a varistor element, which is a two-terminal non-linear element having non-linear current-voltage characteristics, and a three-terminal active matrix scheme using a thin film transistor (hereinafter referred to as TFT) as a switching element. Both of the active matrix schemes have been widely used due to their high performances (high contrast, high-speed response, etc.).

SUMMARY

However, in the active matrix liquid crystal display device, parasitic capacitance or coupling occurring between a signal line, which is connected to a switching element of a single pixel electrode, and a pixel electrode, which is neighboring across the signal line to the single pixel electrode, causes an unnecessary voltage to be applied between the pixel electrode and a counter electrode, resulting in occurrence of crosstalk. Further, there is a problem in that there occurs a difference in display color in dots neighboring across a signal line due to the crosstalk.

In addition, in the above-mentioned liquid crystal display device, the parasitic capacitance or coupling causes a voltage loss, thereby reducing usage efficiency of a voltage used for driving liquid crystal molecules. In other words, a portion of a voltage applied between the pixel electrode and the counter electrode is dissipated due to the parasitic capacitance or coupling, thereby reducing a substantial driving voltage applied to the liquid crystal molecules. With such a reduction of the driving voltage, it is difficult to tilt the liquid crystal molecules to a predetermined angle. Thus, there is a problem in that it is not possible to display images based on desired gray scale.

In particular, the vertical alignment type liquid crystal described in "Development of transflective LCD for high contrast and wide viewing angle by using homeotropic alignment" is in a normally black mode in the absence of applied voltage. Thus, the above-mentioned parasitic capacitance or coupling causes the vertically aligned liquid crystal molecules to be slightly tilted, whereby a small amount of light is transmitted via the liquid crystal molecules. That is, there arises a problem in that crosstalk occurs and a portion in which black display is to be conducted gets a little brighter. Accordingly, in a vertical alignment type liquid crystal display device, there is a difference in display color in dots neighboring across a signal line due to the occurrence of the crosstalk.

It is an advantage of the present invention to provide a liquid crystal display device and an electronic device capable of achieving an excellent display characteristic by preventing operation failure caused by crosstalk when a liquid crystal layer of a vertical alignment type is driven by using an active matrix scheme and thus preventing the occurrence of a difference in display color in dots neighboring across a signal line.

According to one aspect of the present invention, a liquid crystal display device includes a liquid crystal layer, a pixel electrode, a switching element, a signal line, and a same potential line. The liquid crystal layer is composed of liquid crystal that has a negative dielectric anisotropy and so is vertically aligned in an initial alignment state. The pixel electrode has a first side and a second side. The first side being opposite from the second side. The switching element is used for applying driving voltage selectively to the pixel electrode. The signal line is connected to the switching element and is located adjacent to the first side of the pixel electrode. The same potential line extends in the same direction as the signal line and is applied with the same voltage as that applied to the signal line. The same potential line is located adjacent to the second side of the pixel electrode.

Here, the term "signal line" represents a line which is connected to a switching element of a pixel electrode and is used to apply current or voltage to the switching element. Examples of the signal line include a data line and a scanning line in case of a two-terminal switching element, and a gate line and a source line in case of a three-terminal switching element.

The expression "the adjacent to" means in the vicinity of one of the sides of the pixel electrode, or the vicinity of a portion which overlaps at least a portion of the pixel electrode through an insulating film.

According to the aspect of the present invention, the signal line and the same potential line are provided in the vicinity of one end of the pixel electrode and the vicinity of the other end of the pixel electrode, respectively. In addition, the signal line and the same potential line are in the same electrical potential, and thus the same electric field distribution is generated from the signal line and same potential line is formed in the vicinities of both ends of the pixel electrode, whereby shielding is implemented in the pixel electrode. The shielding is intensified against other electrodes neighboring to the pixel electrode and, particularly, against an electrode neighboring across the signal line.

Accordingly, while the related-art liquid crystal display device fails to operate properly due to the crosstalk caused by capacitance created between the signal line and the pixel electrode neighboring across the signal line, the liquid crystal display device according the aspect of the present invention can prevent occurrence of the crosstalk by implementing shielding in the pixel electrode by the signal line and the same potential line provided in the vicinities of both sides of the pixel electrode and thus suppressing parasitic capacitance or coupling with respect to the pixel electrode. Thus, it is possible to suppress a difference in display color in dots neighboring across the signal line, thereby improving a display characteristic.

In addition, the liquid crystal layer may have a negative dielectric anisotropy and so is vertically aligned in its initial state. Since the liquid crystal display device of vertical alignment type is in a normally black mode, display defects such as crosstalk is easy to be detected in a low applied voltage. Since the pixel electrode in which the above-mentioned shielding is implemented applies a potential to the liquid crystal layer of vertical alignment type, it is possible to drive liquid crystal molecules with the parasitic capacitance or coupling suppressed. Accordingly, it is possible to suppress the crosstalk and thus to suppress occurrence of a difference in display color in dots neighboring across the signal line, thereby improving a display characteristic.

In addition, it is possible to realize a liquid crystal display device having a wide viewing angle characteristic by including a liquid crystal layer of vertical alignment type, in addition to suppressing the crosstalk.

In addition, in the liquid crystal display device, connection lines for electrically connecting the signal lines and the same potential lines to each other are provided between the signal lines and the same potential lines.

By doing so, it is not necessary to independently provide the same potential line, i.e., it is not necessary to provide the same potential line separately from the signal line. Thus, the signal line and the same potential line can be in a same potential through the connection line. Also, in case of providing the same potential line independently, since a peripheral circuit of the liquid crystal display device needs to be connected to the same potential line, the construction of the peripheral circuit may become complicated. However, since the signal line and the same potential line are connected to each other through the connection line, the construction of the peripheral circuit can be simplified. Accordingly, it is possible to suppress the parasitic capacitance or coupling by providing the signal line and the same potential line in the vicinities of both ends of the pixel electrode, and also to simplify the peripheral circuit of the liquid crystal display device.

In addition, in the liquid crystal display device, the same potential lines are respectively provided in the pixel electrodes.

By doing so, the same potential line needs not to be commonly provided with respect to a plurality of pixel electrodes and thus the signal line and the same potential line can be in a same potential through the connection line. Also, since the signal line and the same potential line can be in a same potential in each of the pixel electrodes, shielding is implemented in each of the pixel electrodes, thereby suppressing parasitic capacitance or coupling with respect to the pixel electrode and thus suppressing occurrence of crosstalk. Thus, it is possible to suppress a difference in display color in dots neighboring across the signal line, thereby improving a display characteristic.

In addition, in the liquid crystal display device, the connection lines are provided below the pixel electrodes through insulation layers.

By doing so, it is possible to electrically insulate the connection line and the pixel electrode from each other, in addition to achieving the above-mentioned effects achieved by providing the signal line and the same potential line in the vicinities of both sides of the pixel electrode.

In addition, in a liquid crystal display device comprising a vertical alignment type liquid crystal layer, since a protrusion or a slit, or an alignment division portion is provided for alignment regulation in each dot within a unit pixel, there is little space for the independent same potential line within a pixel plane. Also, in case of a high-definition display, it is difficult to provide an independent same potential line in pixel design. Thus, when the independent same potential line is provided within a pixel plane, the aperture ratio of a pixel is reduced. However, since the connection line is provided below the pixel electrode through an insulation layer, it is not necessary to provide the connection line within a pixel plane. In addition, in a case of a high-definition display, it is possible to provide the connection line without any difficulty in pixel design.

Accordingly, a decrease in the aperture ratio of a pixel can be prevented, in addition to achieving the above-mentioned effects achieved by suppressing parasitic capacitance or coupling.

In addition, in the liquid crystal display device, non-formation portions of the pixel electrodes are formed in the pixel electrodes, and the connection lines are located corresponding to the non-formation portions.

The non-formation portion of the pixel electrode, for example, refers to a notch or a slit of the pixel electrode. The expression that "the connection line is located corresponding to the non-formation portion" means that the location of the non-formation portion corresponds to the location of the connection line. For example, that means that the non-formation portion and the connection line are provided in an upper layer and a lower layer, respectively, in a stacked structure, and the non-formation portion and the connection line are located in the same location in plan view (i.e., overlapped).

Here, in a case where the connection line is provided below the pixel electrode, parasitic capacitance or coupling is created between the pixel electrode and the connection line. Thus, crosstalk occurs and the liquid crystal display device fails to operate properly.

On the contrary, in a case where the connection line is located corresponding to the non-formation portion, it is possible to suppress the parasitic capacitance or coupling between the pixel electrode and the connection line to the minimum and thus to suppress occurrence of the crosstalk. Also, it is possible to reliably drive vertical alignment type liquid crystal molecules which are easy to be affected by the crosstalk, thereby realizing a liquid crystal display device having a wide viewing angle characteristic.

In addition, in the liquid crystal display device, the pixel electrodes are provided in each of a plurality of dots within a unit pixel, each of the plurality of the dots has a plurality of sub-dots and dot boundary portions as the non-formation portions used for dividing the sub-dots, and the connection lines are provided below the dot boundary portions.

By providing the connection line below the dot boundary portion, it is possible to suppress the parasitic capacitance or coupling between the pixel electrode and the connection line to the minimum and thus to suppress the occurrence of crosstalk. Also, it is possible to reliably drive vertical alignment type liquid crystal molecules which are easy to be affected by the crosstalk, thereby realizing a liquid crystal display device having a wide viewing angle characteristic.

Also, in the liquid crystal display device, the pixel electrodes have slits as the non-formation portions, and the connection lines are provided below the slits.

By providing the connection line below the slit, it is possible to suppress the parasitic capacitance or coupling between the pixel electrode and the connection line to the minimum and thus to suppress the occurrence of crosstalk. Also, it is possible to reliably drive vertical alignment type liquid crystal molecules which are easy to be affected by the crosstalk, thereby realizing a liquid crystal display device having a wide viewing angle characteristic.

In addition, the above-mentioned liquid crystal display device can be provided in an electronic device. Examples of the electronic device include a mobile phone, a mobile information terminal, a watch, a word processor, and a personal computer. In addition, a wide screen television and a large-sized monitor can be included. Accordingly, it is possible to realize an electronic device having a display unit with a wide viewing angle characteristic and an excellent display characteristic by employing the liquid crystal display device according to the aspect of the present invention in a display unit of the electronic device.

BRIEF DESCRIPTION OF THE DRAWINGS

The invention will be described with reference to the accompanying drawings, wherein like numbers reference like elements, and wherein:

FIG. 3 is a plan view and a cross-sectional view showing the construction of main portions of the liquid crystal display device in the first embodiment according to the present invention;

FIG. 4 is a plan view and a cross-sectional view showing a construction of main parts of a liquid crystal display device in a second embodiment according to the present invention;

DESCRIPTION OF THE EMBODIMENTS

Figure 1:
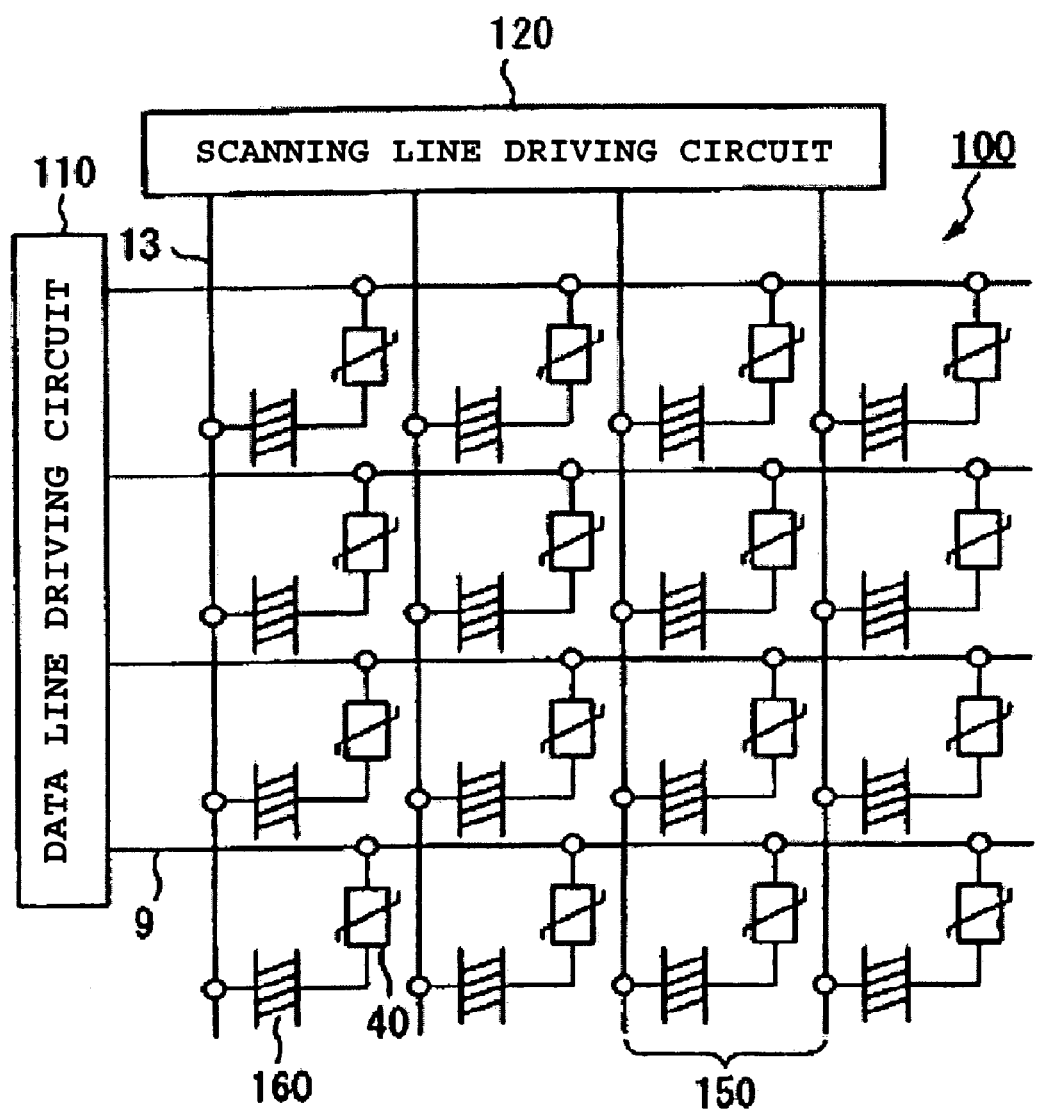
FIG. 1 is an equivalent circuit diagram showing a liquid crystal display device in a first embodiment according to the present invention.

The first embodiment according to the present invention will now be described in detail with reference to the accompanying drawings. In each of the drawings, respective layers or elements are differently scaled so that they can be recognized in the drawings.

A liquid crystal display device according to the present embodiment is an active matrix liquid crystal display device using a thin film diode (hereinafter referred to as TFD) as a switching element and, particularly, a transmissive liquid crystal display device.

FIG. 1 is an equivalent circuit showing a liquid crystal display device 100 according to the present embodiment. The liquid crystal display device 100 comprises a data signal driving circuit 110 and a scanning signal driving circuit 120. The liquid crystal display device 100 is provided with a plurality of scanning lines 13 and a plurality of data lines (signal lines) 9 intersecting the scanning lines 13. The scanning lines 13 are driven by the scanning signal driving circuit 120 and the data lines 9 are driven by the data signal driving circuit 110. In each of pixel areas 150, a TFD element 40 and a liquid crystal displaying element 160 (a liquid crystal layer, which will be described later) are connected in series between the scanning lines 13 and the data lines 9.

While the TFD element 40 is connected to the data line 9 and the liquid crystal displaying element 160 is connected to the scanning line 13 in FIG. 1, the TFD element 40 may be connected to the scanning line 13 and the liquid crystal displaying element 160 may be connected to the data line 9. In this case, the scanning line 13 is an example of a signal line.

Figure 2:
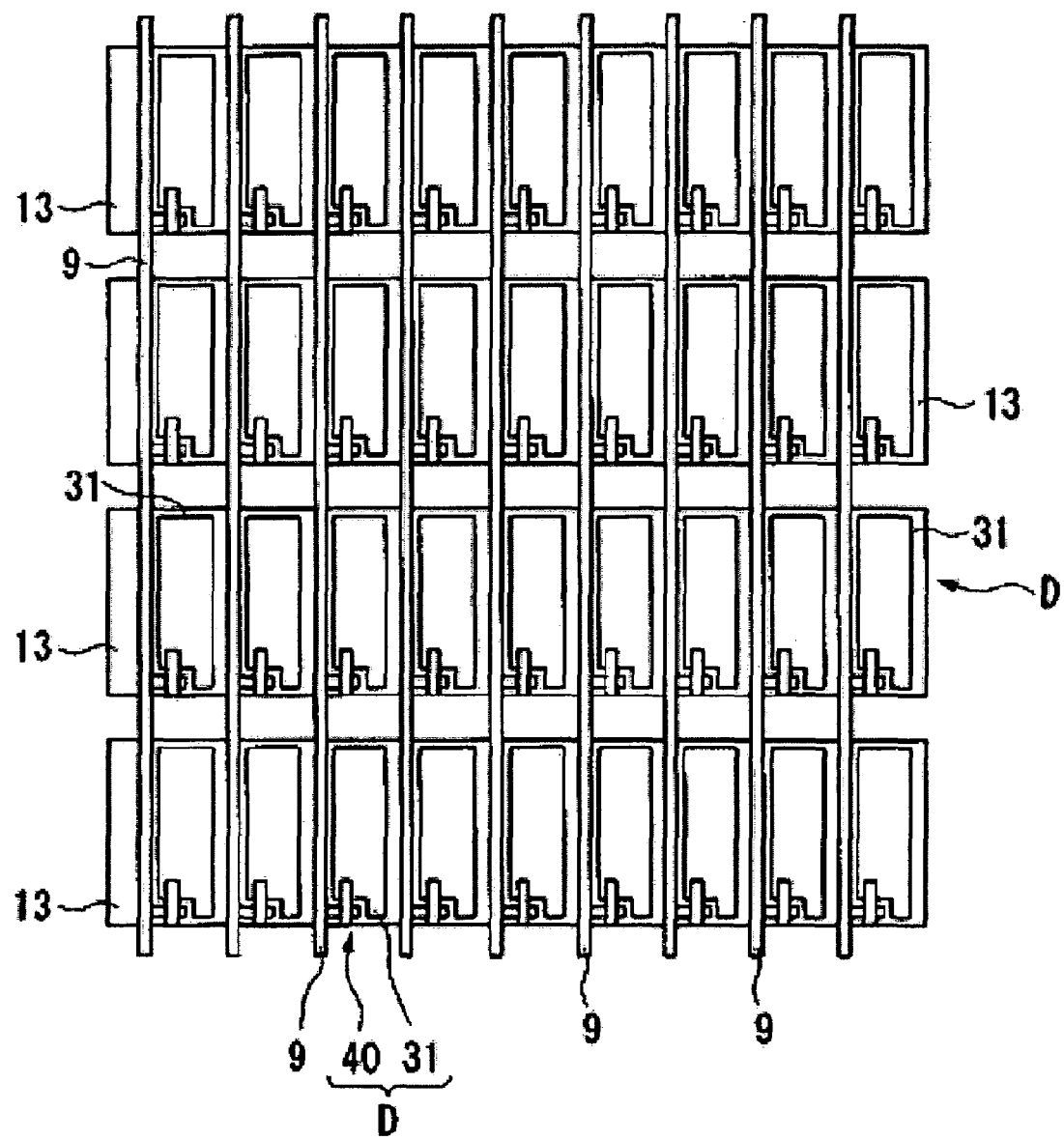
FIG. 2 is a plan view schematically showing an electrode construction of the liquid crystal display device in the first embodiment according to the present invention.

Next, a planar structure of an electrode (pixel structure) provided in the liquid crystal display device 100 according to the present embodiment will now be described with reference to FIG. 2. As shown in FIG. 2, in the liquid crystal display device 100 according to the present embodiment, pixel electrodes 31 each having a rectangular form in plan view are connected to the data lines 9 via the TFD element 40 and are arranged in a matrix form, and common electrodes (second electrodes) 13 are arranged in the form of linearly elongated strips and are provided to oppose the pixel electrodes 31 in a direction perpendicular to the paper surface. The common electrodes 13 are comprised of the scanning lines and intersect the data lines 9 in the form of linearly elongated stripes.

In the present embodiment, an area in which each of the pixel electrodes 31 is provided forms a single dot area D. That is, the TFD element 40 is provided in each dot area D arranged in a matrix form, making it possible to display in each dot area D. In each dot area D, a coloring layer comprised of one of three primary colors of R (red), G (green), and B (blue), which constitutes a color filter, is provided and three dots having respective coloring layers of RGB are provided adjacent, thereby forming a unit pixel.

Here, the TFD element 40 is a switching element for connecting the data line 9 and the pixel electrode 31 to each other. The TFD element 40 has an MIM structure consisting of a first conducting film whose main ingredient is Ta, an insulating film which is provided on the first conducting film and whose main ingredient is $Ta_2O_3$, and a second conducting film which is provided on the insulation film and whose main ingredient is Cr. The first conducting film of the TFD element 40 is connected to the data line 9 and the second conducting film is connected to the pixel electrode 31.

Next, a description will be given of the configuration of main parts of the liquid crystal display device 100 according to the present embodiment with reference to FIG. 3.

FIG. 3A is a plan view showing a dot area D of the liquid crystal display device 100. FIG. 3B is a cross-sectional view taken along the line A-A' in FIG. 3A.

FIG. 3A is a view showing portions constituting the stacked structure of the dot area D in plan view, rather than showing the locational relation of the portions constituting the dot area D along the direction perpendicular to the paper surface.

As shown in FIG. 3A, the dot area D has the pixel electrode 31, the TFD element 40, the data line 9, a dummy data line (same potential line) 11, a connection line 12, and a protrusion 28.

The pixel electrode 31 includes island portions 31a and 31b, and a connecting portion 39 for connecting the island portions 31a and 31b to each other. In addition, the protrusion 28 is formed to correspond to central portions of the island portions 31a and 31b. Here, the island portions 31a and 31b correspond to alignment regulation areas and sub-dots, and the connecting portion 39 corresponds to an alignment division portion and a dot boundary portion.

The data line 9 is provided on the right side (in the vicinity of one end) of the pixel electrode 31, and extends in a longitudinal direction (in an up-and-down direction of paper surface) of the dot area D. The data line 9 is commonly provided in neighboring pixel electrodes in a direction where the data line 9 extends (refer to FIG. 2). In addition, the data line is electrically connected with the first conducting film of the TFD element 40 connected to the pixel electrode 31, and acts so that the potential of a data signal driving circuit can be applied to the pixel electrode 31.

In addition, the dummy data line 11 is provided on the left side (in the vicinity of the other end) of the pixel electrode 31, and extends in a longitudinal direction of the dot area D as is the same with the data line 9. Also, the length of the dummy data line 11, i.e., the length from one end to the other end, is approximately the same as the longitudinal length of the pixel electrode 31. The dummy data line 11 is provided in each of the pixel electrodes 31.

Further, the connection line 12 is used for connecting the data line 9 and the dummy data line 11. The connection line 12 is located corresponding to the location of the connecting portion 39 and is provided below the connecting portion 39 (which will be described later).

A description will now be given of a sectional structure of the liquid crystal display device 100 including a dot area D with reference to FIG. 3B.

As shown in FIG. 3B, the liquid crystal display device 100 has a liquid crystal layer 50, which is made of initially vertically aligned liquid crystal with negative dielectric anisotropy, sealed between a lower substrate 10 and an upper substrate 25 opposing the lower substrate 10. In addition, spacers (not shown) used for keeping the upper and lower substrates 25 and 10 spaced apart from each other are provided between the upper and lower substrates 25 and 10. In addition, a sealing material (not shown) is provided around the upper and lower substrates 25 and 10 to attach them to each other. That is, a space is formed which is surrounded by the sealing material at regular intervals defined by the spacers between the upper and lower substrates 25 and 10, and the liquid crystal layer 50 is provided within the space.

The lower substrate 10 has a structure in which various layers are stacked on a substrate main body 10A made of transmissive material such as quartz or glass. More specifically, the connection line 12, an overcoat layer 22, the pixel electrode 31, and an alignment film 27 are provided on the substrate main body 10A.

Here, the connection line 12 is provided on a surface of the substrate main body 10A and is used for connecting the data line 9 and the dummy data line 11 to each other as described above (refer to FIG. 3A). While the connection line 12 is provided on the substrate main body 10A in the present embodiment, the connection line 12 may be provided on a transparent protection film which is provided on the surface of the substrate main body 10A. In addition, the connection line 12 is provided below the connecting portion 39 in the pixel electrode 31.

The overcoat layer 22 acts to electrically insulate the pixel electrode 31 and the connection line 12 from each other, and is made of organic material such as acrylic resin or polyimide resin, or inorganic material such as $SiO_2$. The overcoat layer 22 is an example of an insulation layer. In addition, the overcoat layer 22 shown in FIG. 3B has a predetermined film thickness to make it possible to remove parasitic capacitance or coupling created between the pixel electrode 31 and the connection-line 12. In addition, the overcoat layer 22 has contact holes (not shown) and connects the second conducting film of the TFD element 40 to the pixel electrode 31.

The pixel electrodes 31 are transparent conducting films such as indium tin oxide (hereinafter referred to as ITO), and are arranged in a matrix form as shown in FIG. 2. The pixel electrode 31, as shown in FIG. 3A, is connected to the data line 9 via the TFD element 40.

The alignment film 27 is made of polyimide or the like, and acts as a vertical alignment film for vertically aligning liquid crystal molecules with respect to a film plane.

Next, the upper substrate 25 has a structure in which various layers are stacked on a substrate main body 25A made of transmissive material such as quartz or glass. More specifically, color filters 23, common electrodes 13, protrusions 28, and an alignment film 33 are provided on the substrate main body 25A.

Here, the color filter 23 is comprised of any one color of RGB, and is different from colors adjacent to the dot area D.

The common electrode 13 is made of a transparent conducting film such as ITO. The common electrode 13 is arranged in the form of linearly elongated strips to extend in a right-and-left direction of the paper surface in FIG. 2, and is commonly provided in a plurality of dot areas D which is located parallel in the right-and-left direction of the paper surface.

The protrusion 28 acts to regulate the alignment of liquid crystal molecules of the liquid crystal layer 50. That is, the protrusion 28 is provided to regulate a tilted direction of the liquid crystal molecules when a voltage is applied between the electrodes with respect to initially vertically aligned liquid crystal molecules. The protrusion 28 is made of resin material formed of an organic film such as acrylic resin, and is formed to protrude from the lower substrate 10 to the liquid crystal layer 50.

The alignment film 33 is made of polyimide. As described above, the protrusion 28 is formed on the substrate main body 25A side of the alignment film 33, thereby regulating a tilted direction of the liquid crystal molecules. Accordingly, a uniform viewing angle characteristic can be achieved within a display area and blurred phenomenon will thus not occur, thereby obtaining an excellent display characteristic.

Next, a retardation film 18 and a polarizer 19 are provided on an external surface (a side other than the one on which the liquid crystal layer 50 is interposed) of the lower substrate 10, and a retardation film 16 and a polarizer 17 are also provided on an external surface of the upper substrate 25, so that circularly polarized light can be incident on the inside of the substrate (on the side of the liquid crystal layer 50). The retardation film 18 and the polarizer 19, and the retardation film 16 and the polarizer 17 constitute respective circular polarizers. The polarizer 17(19) is configured to transmit only linearly polarized light having a polarization axis running in a predetermined direction, and an example of the retardation film 16(18) includes a $\lambda/4$ retardation film. Another example of the circular polarizer includes a combination (wideband circular polarizer) of a polarizer, a $\lambda/2$ retardation film, and a $\lambda/4$ retardation film. In this case, black display can be more achromatic. In addition, another example of the circular polarizer includes a combination of a polarizer, a $\lambda/2$ retardation film, a $\lambda/4$ retardation film, and a c plate (a retardation film having an optical axis running in a direction of film thickness), thereby achieving a much wider viewing angle. In addition, a backlight 15 which is a light source for transmissive display is provided on the outer surface of the polarizer 19 formed on the lower substrate 10.

In the liquid crystal display device 100 having the above-mentioned construction, the data signal driving circuit 110 and the scanning signal driving circuit 120 supply a potential to the data lines 9 and the scanning lines 13, thereby applying a voltage between the pixel electrode 31 and the common electrode 13 with TFD element 40 turned on. The liquid crystal molecules of the liquid crystal layer 50 whose alignment is regulated by the protrusion 28 are tilted to a predetermined direction and a predetermined angle, thereby controlling the amount of light of the backlight 15. The transmissive light whose amount is controlled emits toward the upside of the upper substrate 25 through each of the coloring layers of RGB, thereby performing a full color display.

In the liquid crystal display device 100, since the data line 9 and the dummy data line 11 are provided on both sides of the pixel electrode 31 and are connected to each other by the connection line 12, the same potential is applied to the data line 9 and the dummy data line 11 in synchronization with a displaying operation of the liquid crystal display device 100. Thus, the same electric field distribution is formed in the vicinities of the data line 9 and the dummy data line 11 on both sides of the pixel electrode 31, and the electric field distribution covers both sides of the pixel electrode 31, whereby shielding (protection by an electric field) is implemented in the pixel electrode 31. The shielding is intensified against other electrodes neighboring to the pixel electrode 31 and, particularly, against a pixel electrode 31 neighboring across the data line 9.

As described above, in the present embodiment, the data line 9 and the dummy data line 11, which are in the same potential, are provided on both sides of the pixel electrode 31, and shielding can be implemented in the pixel electrode 31 by the electric field of both lines 9 and 11. Accordingly, shielding can be intensified against other electrodes neighboring to the pixel electrode 31 and, particularly, against a pixel electrode 31 neighboring across the data line 9.

Accordingly, while the related-art liquid crystal display device fails to operate properly due to the crosstalk caused by capacitance created between the data line 9 and the pixel electrode 31 neighboring across the data line 9, the occurrence of the crosstalk can be prevented by implementing shielding in the pixel electrode 31 by the data line 9 and the dummy data line 11 provided in the vicinities of both sides of the pixel electrode 31 and thus suppressing parasitic capacitance or coupling with respect to the pixel electrode 31. Thus, it is possible to suppress a difference in display color in dots neighboring across the data line 9, thereby improving a display characteristic.

Further, the liquid crystal display device 100 comprises the liquid crystal layer 50 made of initially vertically aligned liquid crystal with negative dielectric anisotropy. Since the liquid crystal layer 50 of the vertical alignment type is a normally black mode, the vertically aligned liquid crystal molecules are slightly tilted due to the occurrence of the parasitic capacitance and coupling, and thus a small amount of light is transmitted through the liquid crystal molecules. That is, a display characteristic is significantly deteriorated due to the crosstalk. For the liquid crystal layer 50 of such a vertical alignment type, since the pixel electrode 31 in which the above-mentioned shielding has been implemented supplies a potential, the liquid crystal molecules can be driven while the parasitic capacitance or coupling has been suppressed. Accordingly, since the crosstalk can be suppressed, it is possible to suppress a difference in display color in dots neighboring across the data line 9, and thus to improve a display characteristic.

Further, it is possible to realize a liquid crystal display device 100 having a wide viewing angle characteristic by including a liquid crystal layer of vertical alignment type, in addition to realizing a display characteristic in which the crosstalk is suppressed.

In addition, in the liquid crystal display device 100, since the data lines 9 and the dummy data lines 11 are connected to each other by the connection lines 12, the dummy data lines 11 need not to be independently provided, i.e., the dummy data lines 11 need not to be provided separately from the data lines 9. Thus, the data lines 9 and the dummy data lines 11 can be in a same potential through the connection lines 12. Also, in case of providing the dummy data line 11 independently, since peripheral circuits of the liquid crystal display device 100 need to be connected to the dummy data lines 11, the constructions of the peripheral circuits may become complicated. However, since the data lines 9 and the dummy data lines 11 are connected to each other through the connection lines 12, the constructions of the peripheral circuits can be simplified. Accordingly, it is possible to suppress the parasitic capacitances or couplings by providing the data lines 9 and the dummy data lines 11 in the vicinities of both ends of the pixel electrode 31, and to simplify the peripheral circuits of the liquid crystal display device 100.

In the liquid crystal display device 100, since the dummy data line 11 is provided in each pixel electrode 31, a common dummy data line 11 needs not to be provided with respect to a plurality of pixel electrodes 31 and thus the data line 9 and the dummy data line 11 can be in a same potential through the connection line 12. Also, since the data line 9 and the dummy data line 11 can be in a same potential in each of the pixel electrodes 31, shielding is implemented in each of the pixel electrodes 31, thereby suppressing parasitic capacitance or coupling with respect to the pixel electrode 31 and thus suppressing occurrence of crosstalk. Thus, it is possible to suppress a difference in display color in dots neighboring across the data line 9, thereby improving a display characteristic.

Further, in the liquid crystal display device 100, since the connection line 12 is provided below the pixel electrode 31 through the overcoat layer 22, it is possible to electrically insulate the connection line 12 and the pixel electrode 31 from each other, in addition to achieving the above-mentioned effects achieved by providing the data line 9 and the dummy data line 11 at both sides of the pixel electrode 31.

In addition, in the liquid crystal display device comprising the liquid crystal layer 50 of a vertical alignment type, since the protrusion 28 or slit (which will be described later), or the connecting portion 39 is provided for alignment regulation in each dot area D within a unit pixel, there is little space for the connection line 12 within a pixel plane. Also, in case of a high-definition display, it is difficult to provide the connection line 12 in pixel design. Thus, when the connection line 12 is provided within a pixel plane, the aperture ratio of a pixel is reduced.

On the contrary, according to the present embodiment, since the connection line 12 is provided below the pixel electrode 31 through the overcoat layer 22, it is not necessary to provide the connection line 12 within a pixel plane. In addition, in a case of a high-definition display, it is possible to provide the connection line 12 without any difficulty in pixel design.

Accordingly, a decrease in the aperture ratio of a pixel can be prevented, in addition to achieving the above-mentioned effects achieved by suppressing parasitic capacitance or coupling.

Further, in the liquid crystal display device 100, since the connection line 12 is provided below the connecting portion 39 for electrically conducting the island portions 31*a* and 31*b* rather than simply below the pixel electrode 31, an area in which the pixel electrode 31 and the connection line 12 overlap becomes minimum, thereby suppressing the parasitic capacitance or coupling between the pixel electrode 31 and the connection line 12 to the minimum. Further, it is possible to suppress the occurrence of crosstalk caused by the parasitic capacitance or coupling.

In addition, the liquid crystal display device comprising the liquid crystal layer 50 of a vertical alignment type tends to be affected by the crosstalk. Thus, by suppressing the occurrence of crosstalk as described above, it is possible to correctly drive liquid crystal molecules of the liquid crystal layer 50, thereby realizing the liquid crystal display device 100 having a wide viewing angle characteristic.

A second embodiment according to the present invention will now be described in detail with reference to the accompanying drawings.

The same components are denoted by the same reference numerals in the first and second embodiments, and a description thereof will not be given in the second embodiment.

A liquid crystal display device according to the present embodiment is the same as the first embodiment in the basic construction shown in FIGS. 1 and 2, but is different from the first embodiment in the construction of the dot area D.

FIG. 4 is a view showing the construction of main parts of the liquid crystal display device 100 according to the present embodiment. FIG. 4A is a plan view showing the dot area D of the liquid crystal display device 100. FIG. 4B is a cross-sectional view taken along the line B-B' shown in FIG. 4A.

Also, FIG. 4A is a view showing portions constituting the stacked structure of the dot area D in plan view, rather than showing the locational relation of the portions constituting the dot area D along the direction perpendicular to the paper surface.

As shown in FIG. 4A, the dot area D has a pixel electrode 31, a TFD element 40, a data line 9, a dummy data line 11, a connection line 12, and slits 35 and 36.

Here, the slits 35 are formed in the common electrode 13, and the slits 36 are formed in the pixel electrode 31. The slits 35 and 36 are formed to be slightly tilted. More specifically, as shown in FIG. 4A, the slits 35 and 36 extend in a top-right/bottom-left direction in an upper portion of the dot area D, and the slits 35 and 36 extend in a top-left/bottom-right direction in a lower portion of the dot area D. The upper and lower portions of the dot area D are examples of alignment regulation areas. The slits 35 and 36 are examples of alignment division portions.

By forming the slits 35 and 36, when a voltage is applied between the common electrode 13 and the pixel electrode 31, an electric field is formed between electrode planes, thereby regulating a tilted direction of the liquid crystal layer 50.

The connection line 12 connects the data line 9 and the dummy data line 11 to each other and runs in a top-right/bottom-left direction. Also, the connection line 12 is located corresponding to the location of the slit 36 formed in the pixel electrode 31. In more detail, as described below, the connection line 12 is provided below the slit 36.

Next, a description will be given of a sectional structure of the liquid crystal display device 100 including the dot area D with reference to FIG. 4B.

As shown in FIG. 4B, similar to the first embodiment, the liquid crystal display device 100 has a liquid crystal layer 50, which is made of initially vertically aligned liquid crystal material with negative dielectric anisotropy, sealed between the lower substrate 10 and the upper substrate 25 opposing the lower substrate 10.

In the present embodiment, in particular, the slits 35 and 36 are formed in each of the common electrode 33 and the pixel electrode 31. Also, the connection line 12 is provided below the slit 35 through the overcoat layer 22.

In the liquid crystal display device 100 having the above-mentioned construction, similar to the first embodiment, the data signal driving circuit 110 and the scanning signal driving circuit 120 supply a potential to the data line 9 and the scanning line 13, thereby applying a voltage between the pixel electrode 31 and the common electrode 13 with TFD element 40 turned on. The liquid crystal molecules of the liquid crystal layer 50 whose alignment is regulated are tilted to a predetermined direction and a predetermined angle, thereby controlling the amount of light of the backlight 15. The transmissive light whose amount is controlled emits toward the upside of the upper substrate 25 through each of the coloring layers of RGB, thereby performing a full color display.

In the liquid crystal display device 100 having the above-mentioned construction, the data signal driving circuit 110 and the scanning signal driving circuit 120 supply a potential to the data line 9 and the scanning line 13, thereby applying a voltage between the pixel electrode 31 and the common electrode 13 with TFD element 40 turned on. The liquid crystal molecules of the liquid crystal layer 50 whose alignment is regulated by the slits 35 and 36 are tilted to a predetermined direction and a predetermined angle, thereby controlling the amount of light of the backlight 15. The transmissive light whose amount is controlled emits toward the upside of the upper substrate 25 through each of the coloring layers of RGB, thereby performing a full color display.

In addition, similar to the first embodiment, the same potential is applied to the data line 9 and the dummy data line 11 in synchronization with a displaying operation of the liquid crystal display device 100. Thus, the same electric field distribution is formed in the vicinities of the data line 9 and the dummy data line 11 on both sides of the pixel electrode 31, and the electric field distribution covers both sides of the pixel electrode 31, whereby shielding is implemented in the pixel electrode 31. The shielding is intensified against other electrodes neighboring to the pixel electrode 31 and, particularly, against a pixel electrode 31 neighboring across the data line 9.

As described above, according to the present embodiment, by implementing shielding on both sides of the pixel electrode 31, shielding can be intensified against other electrodes neighboring to the pixel electrode 31 and, particularly, against a pixel electrode 31 neighboring across the data line 9. Accordingly, it is possible to suppress the parasitic capacitance or coupling with respect to the pixel electrode 31, thereby suppressing the occurrence of crosstalk. Further, by suppressing the parasitic capacitance or coupling with respect to the pixel electrode 31, voltage dissipated due to the parasitic capacitance can be used as a driving voltage of the liquid crystal layer 50. Accordingly, with an increase in the substantial driving voltage, it is possible to reliably apply a voltage to the liquid crystal molecules, thereby driving the liquid crystal molecules with a driving voltage based on a design value. Further, it is possible to realize a liquid crystal display device having a wide viewing angle characteristic using the vertical alignment type liquid crystal layer 50.

In addition, since the data line 9 and the dummy data line 11 are connected to each other by the connection line 12 and the connection line 12 is provided below the overcoat layer 22, an aperture ratio of a pixel cannot be reduced even though portions for alignment regulation or alignment division are provided. Accordingly, it is possible to achieve the above-mentioned effects resulting from the suppression of the parasitic capacitance or coupling and also to prevent the aperture ratio of a pixel from being reduced.

In the liquid crystal display device 100, since the connection line 12 is provided below the slit 36 rather than simply below the pixel electrode 31, an area in which the pixel electrode 31 and the connection line 12 overlap becomes minimum, thereby suppressing the parasitic capacitance or coupling between the pixel electrode 31 and the connection line 12 to the minimum. In addition, it is possible to suppress the occurrence of crosstalk caused by the parasitic capacitance or coupling. Accordingly, it is possible to suppress the occurrence of a difference in display color in dots neighboring across the data line 9, thereby improving a display characteristic.

Further, a liquid crystal display device having the vertical alignment type liquid crystal layer 50 tends to be affected by the crosstalk. Thus, by suppressing the occurrence of crosstalk as described above, it is possible to correctly drive liquid crystal molecules of the liquid crystal layer 50, thereby realizing the liquid crystal display device 100 having a wide viewing angle characteristic.

While a transmissive liquid crystal display device has been described in the first and second embodiments, the present invention is not limited thereto. For example, the present invention can be applied to a transflective liquid crystal display device which has a transmissive display area and a reflective display area and has a multi-gap structure in which both of the viewing areas have different liquid crystal layer thicknesses from each other, or a reflective liquid crystal display device.

Further, while the liquid crystal display device 100 using the TFD element 40 as a switching element has been described in the above-mentioned first and second embodiments, the present invention is not limited thereto. The present invention can be applied to the liquid crystal display device 100 using the TFT element. In this case, a dummy line is provided to act as a same potential line with respect to a gate line or a source line, and the dummy line is connected to the gate line or the source line through the connection line 12.

Figure 5:
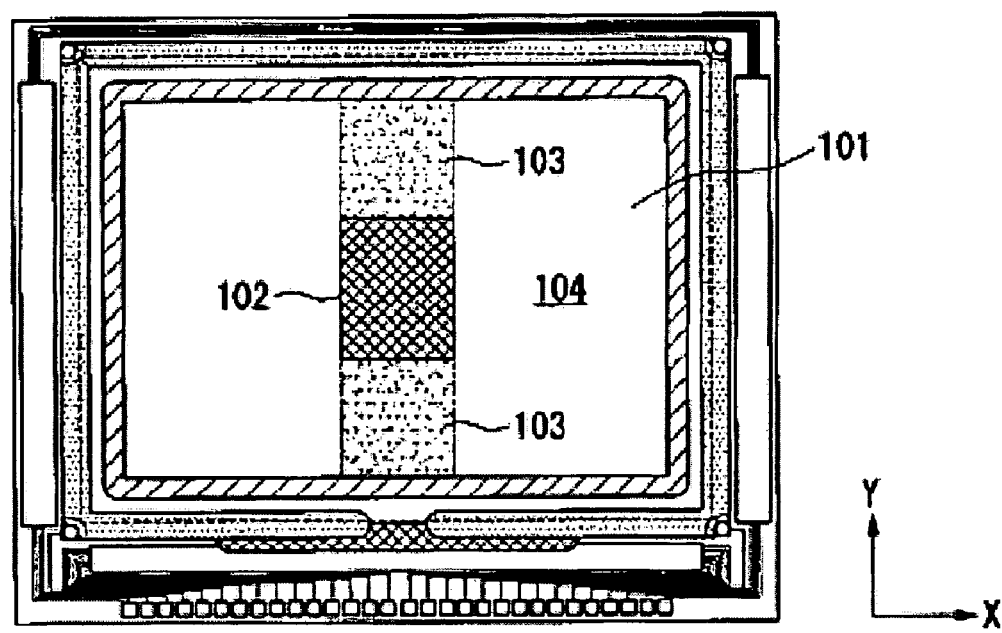
FIG. 5 is a view illustrating an embodiment according to the present invention.

FIG. 5 is a view showing a method of measuring crosstalk and shows a display plane of a liquid crystal display device. In FIG. 5, the data lines 9 run in a Y-direction (in an up-and-down direction of the paper surface) of the liquid crystal display device.

The method of measuring crosstalk will now be described.

First, in a display plane 101 of a liquid crystal display device, 'white display' and 'gray display' are conducted in a display portion denoted by reference numeral 102. Here, 'gray display' refers to a color represented to be 30% of brightness of 'white display'. Subsequently, while 'white display' and 'gray display' are conducted, brightnesses of upper/lower portions 103 of the display portion 102 and a background portion 104 are measured. Next, on the basis of measurement results of the upper/lower portions 103 and the background portion 104, variation rates are calculated on how low the brightnesses of the upper/lower portions 103 are displayed compared to the brightness of the background portion 104.

Further, in the method of measuring crosstalk, the measurement is performed for each of a related-art liquid crystal display device and the liquid crystal display device 100. Here, the related-art liquid crystal display device refers to a device in which a dummy data line 11 is not provided in a side of a pixel electrode 31.

Next, Table 1 shows a measurement result.

TABLE 1

| | Measurement color | |
|---|---|---|
| | White | Gray (30%) |
| Liquid crystal display device according to the related-art technique | 0.73% | 0.80% |
| Liquid crystal display device according to the embodiment | 0.39% | 0.73% |

As shown in Table 1, in case of white display, the variation rate of brightness of the upper/lower portions 103 is 0.73% in the related-art liquid crystal display device and 0.39% in the liquid crystal display device according to the embodiment. In addition, in case of gray display, the variation rate of brightness of the upper/lower portions 103 is 0.80% in the related-art liquid crystal display device and 0.73% in the liquid crystal display device according to the present invention. In particular, in case of white display, the liquid crystal display device according to the present invention is about a half in the variation rate compared to the related-art liquid crystal display device.

As described in the above-mentioned embodiment, the liquid crystal display device according to the present invention can suppress the occurrence of crosstalk compared to the related-art liquid crystal display device.

Accordingly, it is possible to achieve an effect of suppressing the crosstalk by using the construction of the liquid crystal display device according to the present invention in which the data lines 9 and the dummy data lines 11 are provided on both sides of the pixel electrodes 31.

(Electronic Device)

Figure 6:
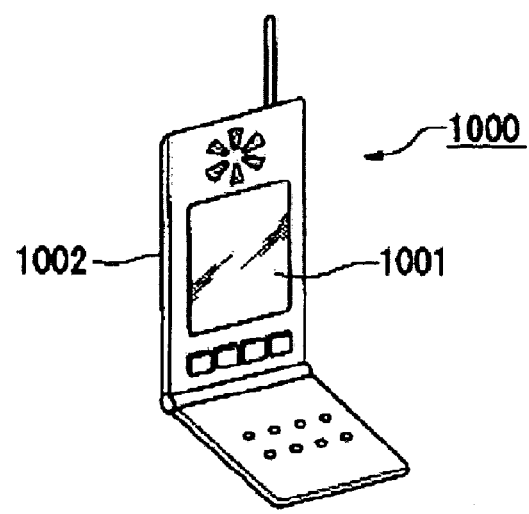
FIG. 6 is a view showing an electronic device having the liquid crystal display device according to the present invention.

FIG. 6 shows an embodiment of an electronic device according to the present invention.

The electronic device comprises the above-mentioned liquid crystal display device as display means.

FIG. 6 is a perspective view showing an example of a mobile phone. In FIG. 6, reference numeral 1000 denotes a main body of a mobile phone, and reference numeral 1001 denotes a display unit using the above-mentioned liquid crystal display device. Since the electronic device shown in FIG. 6 comprises the liquid crystal display device according to the present invention in the display unit, it is possible to provide an electronic device having a display unit with a wide viewing angle characteristic and an excellent display characteristic.

While the present invention has been described with reference to exemplary embodiments thereof, it will be understood by those skilled in the art that various changes in form and details may be made therein without departing from the scope of the present invention as defined by the following claims.

What is claimed is:

1. A liquid crystal display device comprising:
   a liquid crystal layer composed of liquid crystal that has a negative dielectric anisotropy;
   a plurality of pixel electrodes each corresponding to a dot, a plurality of the dots defining a unit pixel and each pixel electrode having a first side and a second side, the first side being opposite from the second side;
   a switching element used for applying driving voltage selectively to the pixel electrode;
   a signal line connected to the switching element and located adjacent to the first side of the pixel electrode;
   a same potential line that extends in the same direction as the signal line and being applied with the same voltage as that applied to the signal line, the same potential line being located adjacent to the second side of the pixel electrode; and
   a connection line that electrically connects the signal line to the same potential line, the connection line being located between the signal line and the same potential line,
   wherein a non-formation portion, where the pixel electrode is not formed, is located adjacent to the pixel electrode, the connection line being located in substantial alignment with the non-formation portion; and
   each of the plurality of the dots includes a plurality of sub-dots and a dot boundary portion, the dot boundary portion being disposed between the sub-dots and including the non-formation portion, the connection line being provided below the dot boundary portion.

2. The liquid crystal display device according to claim 1, further comprising a plurality of pixel electrodes and a plurality of same potential lines, at least one of the same potential lines being provided to each of the pixel electrodes.

3. A liquid crystal display device comprising:
a liquid crystal layer composed of liquid crystal that has a negative dielectric anisotropy;
a pixel electrode having a first side and a second side, the first side being opposite from the second side;
a switching element used for applying driving voltage selectively to the pixel electrode;
a signal line connected to the switching element and located adjacent to the first side of the pixel electrode;
a same potential line that extends in the same direction as the signal line and being applied with the same voltage as that applied to the signal line, the same potential line being located adjacent to the second side of the pixel electrode; and
a connection line that electrically connects the signal line to the same potential line, the connection line being located between the signal line and the same potential line,
wherein a non-formation portion, where the pixel electrode is not formed, is located adjacent to the pixel electrode, the connection line being located in substantial alignment with the non-formation portion; and
the pixel electrode includes a slit as the non-formation portion, the connection line being provided below the slit.

4. A liquid crystal display device comprising:
a liquid crystal layer composed of a liquid crystal that has a negative dielectric anisotropy;
a pixel electrode having a first side and a second side, the first side being opposite from the second side;
a switching element used for applying driving voltage selectively to the pixel electrode;
a signal line connected to the switching element and located adjacent to the first side of the pixel electrode;
a same potential line that extends in the same direction as the signal line, the same potential line being located adjacent to the second side of the pixel electrode; and
a connection line that electrically connects the same potential line to the signal line so that the same potential line is applied with the same voltage as that applied to the signal line, the connection line extending across the pixel electrode,
wherein the pixel electrode includes island portions and a connecting portion that connects the island portions to each other, and the connection line extends across the connection portion of the pixel electrode.

5. A liquid crystal display device comprising:
a liquid crystal layer composed of liquid crystal that has a negative dielectric anisotropy;
a pixel electrode including two slits for controlling orientation of the liquid crystal, the pixel electrode having a first edge and a second edge, the first edge being opposite from the second edge;
a switching element located adjacent to the first edge of the pixel electrode;
a line electrically connected to the switching element and extending between the two slits of the pixel electrode; and
a same potential line electrically connected to the line so as to have the same potential as the line, the same potential line being located adjacent to the second edge of the pixel electrode and extending along the second edge of the pixel electrode.

* * * * *